US008199202B2

(12) United States Patent
Watanabe

(10) Patent No.: US 8,199,202 B2
(45) Date of Patent: Jun. 12, 2012

(54) IMAGE PROCESSING DEVICE, STORAGE MEDIUM STORING IMAGE PROCESSING PROGRAM, AND IMAGE PICKUP APPARATUS

(75) Inventor: Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 501 days.

(21) Appl. No.: 12/534,259

(22) Filed: Aug. 3, 2009

(65) Prior Publication Data

US 2010/0033584 A1    Feb. 11, 2010

(30) Foreign Application Priority Data

Aug. 5, 2008 (JP) ................................. 2008-202203

(51) Int. Cl.
*H04N 5/228* (2006.01)
(52) U.S. Cl. ................................................. 348/208.13
(58) Field of Classification Search .............. 348/208.13
See application file for complete search history.

(56) References Cited

U.S. PATENT DOCUMENTS

2006/0244866 A1* 11/2006 Kishida .......................... 348/699
2007/0140346 A1* 6/2007 Chen et al. ................. 375/240.16
2008/0043848 A1* 2/2008 Kuhn ........................ 375/240.16
2009/0115856 A1* 5/2009 Washisu ....................... 348/208.1

FOREIGN PATENT DOCUMENTS

| JP | 8-163573 A | 6/1996 |
| JP | 8-251474 A | 9/1996 |
| JP | 3164121 B2 | 3/2001 |
| JP | 2007-129587 A | 5/2007 |

* cited by examiner

*Primary Examiner* — James Hannett
(74) *Attorney, Agent, or Firm* — Holtz, Holtz, Goodman & Chick, PC

(57) ABSTRACT

An image processing device that performs registration processing between a plurality of images using an image transformation defined by at least one inter-frame motion vector, is provided with a lens characteristic acquisition unit for obtaining a lens characteristic of an imaging lens that photographs the plurality of images; a motion vector measurement region setting unit for setting, on the basis of the lens characteristic, a plurality of motion vector measurement regions in each of which a motion vector is to be measured; a motion vector reliability calculation unit for calculating a reliability of each of calculated motion vectors; and a motion vector integration processing unit for calculating the at least one inter-frame motion vector by integrating the motion vectors of the plurality of motion vector measurement regions in accordance with the reliability of the motion vectors.

28 Claims, 13 Drawing Sheets

IMAGE PROCESSING DEVICE, STORAGE MEDIUM STORING IMAGE PROCESSING PROGRAM, AND IMAGE PICKUP APPARATUS

FIELD OF THE INVENTION

This invention relates to a technique for performing registration (including motion blur correction) between a plurality of images.

BACKGROUND OF THE INVENTION

A block matching method and a correlation method based on a correlation calculation are known as methods of detecting a motion vector of an image during motion blur correction and the like.

In the block matching method, an input image is divided into a plurality of blocks of an appropriate size (for example, 8 pixels×8 lines). Using these block units, differences in pixel values between a certain region of a current field (frame) and a previous field is calculated. On the basis of this difference, a block of the previous field that has a high correlation with a certain block of the current field is searched for. Thereafter relative displacement between the two blocks is set as the motion vector of the certain block.

In a method of searching for a highly correlated block during block matching, the correlation is evaluated using a sum of squared difference (SSD), which is a sum of squares of the differences in the pixel values, and a sum of absolute difference (SAD), which is an absolute value sum of the pixel value differences. The lower the SSD or SAD value is, the higher the evaluation of correlation is. The SSD and SAD are expressed respectively by following Equations (1) and (2).

$$SSD(I, I') = \sum_{p \in I, q \in I'} (Lp - Lq)^2 \quad (1)$$

$$SAD(I, I') = \sum_{p \in I, q \in I'} \|Lp - Lq\| \quad (2)$$

Here, p is a pixel position within a matching reference block region I of the current field, and q is a pixel position (a position corresponding to the pixel position p) within a matching subject block region I' of the previous field. Accordingly, p and q are quantities taking two-dimensional values. I and I' respectively denote two-dimensional regions of the current field and the previous field. The term p∈I indicates that the coordinate p is included in the region I, while the term q∈I' indicates that the coordinate q is included in the region I'. Pixel values of the pixel positions p and q are indicated by Lp and Lq, respectively.

Meanwhile, in the correlation method based on a correlation calculation, average values Ave (Lp), Ave (Lq) of the pixels p∈I and q∈I' included respectively in the reference block region I and the subject block region I' of the matching operation are calculated. Differences between the pixel values included in the respective blocks and these average values are calculated using a following Equation (3).

$$Lp' = \frac{Lp - Ave(Lp)}{\sqrt{\frac{1}{n}\sum_{p \in I}(Lp - Ave(Lp))^2}}\bigg|_{p \in I} \quad (3)$$

$$Lq' = \frac{Lq - Ave(Lq)}{\sqrt{\frac{1}{n}\sum_{q \in I}(Lq - Ave(Lq))^2}}\bigg|_{q \in I'}$$

Next, a normalization cross-correlation NCC is calculated using an Equation (4).

$$NCC = \Sigma Lp'Lq' \quad (4)$$

Blocks having a large normalization cross-correlation NCC are determined to be highly correlated blocks, and the displacement between the blocks I' and I exhibiting the highest correlation is recognized as the motion vector.

When objects or a photography subjects included in an image are stationary, movements within individual regions accords to the movement of the entire image. Therefore, in this case, the block in which the correlation calculation described above is performed may be disposed in an arbitrary fixed position and the motion vector thereof may be calculated.

It should be noted that in certain cases, a highly reliable motion vector cannot be obtained due to the effects of noise or when the block is on a flat portion or adjacent to an edge portion having a larger structure than the block. To eliminate these cases, JP8-163573A and JP3164121B, for example, disclose techniques for performing a reliability determination when calculating a motion vector.

Further, when the object or photography subject included in the image includes a plurality of movements, the motion vector of the entire image may be calculated with the aim of correcting blur, for example. In JP8-251474A, the object is divided into a plurality of regions and an important region is selected from the plurality of regions in accordance with the magnitude of the motion vector, the size of the region, and so on. The motion vector of the selected region is then recognized as the motion vector of the entire image.

In this case, region selecting means select any one of the following important regions (i) to (iv).

(i) The region having the greatest range of the plurality of regions.
(ii) The region having the smallest motion vector of the plurality of regions.
(iii) The region of the plurality of regions that has the greatest range of overlap with a previously selected region.
(iv) One of the region having the greatest range, the region having the smallest motion vector, and the region having the greatest range of overlap with the previously selected region.

Incidentally, when registration such as electronic motion correction is performed on an image pickup apparatus having a lens that has a large aberration, the amount of displacement caused by the aberration in the image varies in each position of the image. For example, in a wide angle lens or the like, the displacement amount caused by image distortion varies at each image height. It is therefore difficult to determine an inter-frame motion vector (a correction vector) between a plurality of images photographed using a lens having a large aberration. The reason for this is that a correspondence relationship between a motion vector determined on an image having no aberration and a motion vector determined on an image having an aberration varies in each image position (at each image height, for example).

For example, when barrel distortion such as that shown in FIG. 1A exists, the inter-frame motion vector is estimated to be smaller than the inter-frame motion vector when no aberration exists in a region having a great image height. Conversely, when pincushion distortion such as that shown in FIG. 1B exists, the inter-frame motion vector is estimated to be larger than the inter-frame motion vector when no aberration exists in a region having a great image height.

JP2007-129587A proposes a technique for dealing with distortion in which electronic blur correction through determination of an inter-frame motion vector is performed on an image that has been subjected to distortion correction.

SUMMARY OF THE INVENTION

An image processing device according to one aspect of this invention, that performs registration processing between a plurality of images using an image transformation defined by at least one inter-frame motion vector, comprises: a lens characteristic acquisition unit for obtaining a lens characteristic of an imaging lens that photographs the plurality of images; a motion vector measurement region setting unit for setting, on the basis of the lens characteristic, a plurality of motion vector measurement regions in each of which a motion vector is to be measured; a motion vector calculation unit for calculating the motion vectors of the plurality of motion vector measurement regions; a motion vector reliability calculation unit for calculating a reliability of each of the calculated motion vectors; and a motion vector integration processing unit for calculating the at least one inter-frame motion vector by integrating the motion vectors of the plurality of motion vector measurement regions in accordance with the reliability of the motion vectors.

A storage medium according to another aspect of this invention stores an image processing program for causing a computer to execute: a lens characteristic acquisition procedure for obtaining a lens characteristic of an imaging lens that photographs a plurality of images; a motion vector measurement region setting procedure for setting, on the basis of the lens characteristic, a plurality of motion vector measurement regions in each of which a motion vector between the plurality of images is to be measured; a motion vector calculation procedure for calculating the motion vectors of the plurality of motion vector measurement regions; a motion vector reliability calculation procedure for calculating a reliability of each of the calculated motion vectors; a motion vector integration processing procedure for calculating at least one inter-frame motion vector by integrating the motion vectors of the plurality of motion vector measurement regions in accordance with the reliability of the motion vectors; and a procedure for performing registration of the plurality of images using an image transformation defined by the at least one inter-frame motion vector.

An image pickup apparatus according to still another aspect of this invention, having an imaging lens and an image pickup unit for converting an optical image formed by the imaging lens into an electric signal, which performs registration processing between a plurality of images obtained from the image pickup unit using an image transformation defined by at least one inter-frame motion vector, comprises: a lens characteristic acquisition unit for obtaining a lens characteristic of the imaging lens that photographs the plurality of images; a motion vector measurement region setting unit for setting, on the basis of the lens characteristic, a plurality of motion vector measurement regions in each of which a motion vector is to be measured; a motion vector calculation unit for calculating the motion vectors of the plurality of motion vector measurement regions; a motion vector reliability calculation unit for calculating a reliability of each of the calculated motion vectors; and a motion vector integration processing unit for calculating the at least one inter-frame motion vector by integrating the motion vectors of the plurality of motion vector measurement regions in accordance with the reliability of the motion vectors.

BRIEF DESCRIPTION OF THE DRAWINGS

In FIGS. 1A and 1B, dotted lines indicate an ideal image in which no distortion exists, while solid lines indicate an actual image in which distortion exists.

DESCRIPTION OF THE PREFERRED EMBODIMENTS

[First Embodiment]

Figure 1A:
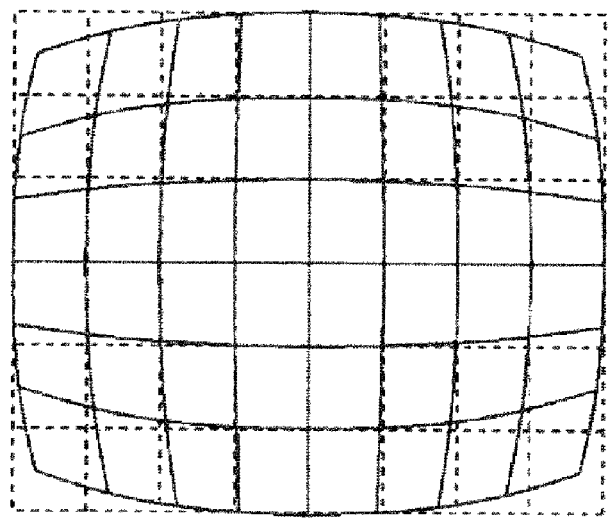
FIG. 1A is a view showing barrel distortion.
Figure 1B:
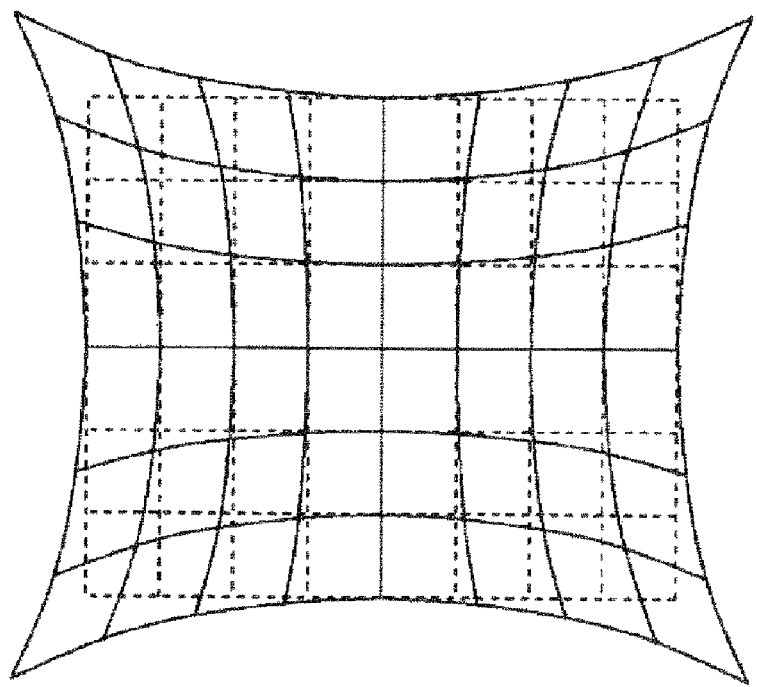
FIG. 1B is a view showing pincushion distortion.
Figure 2:
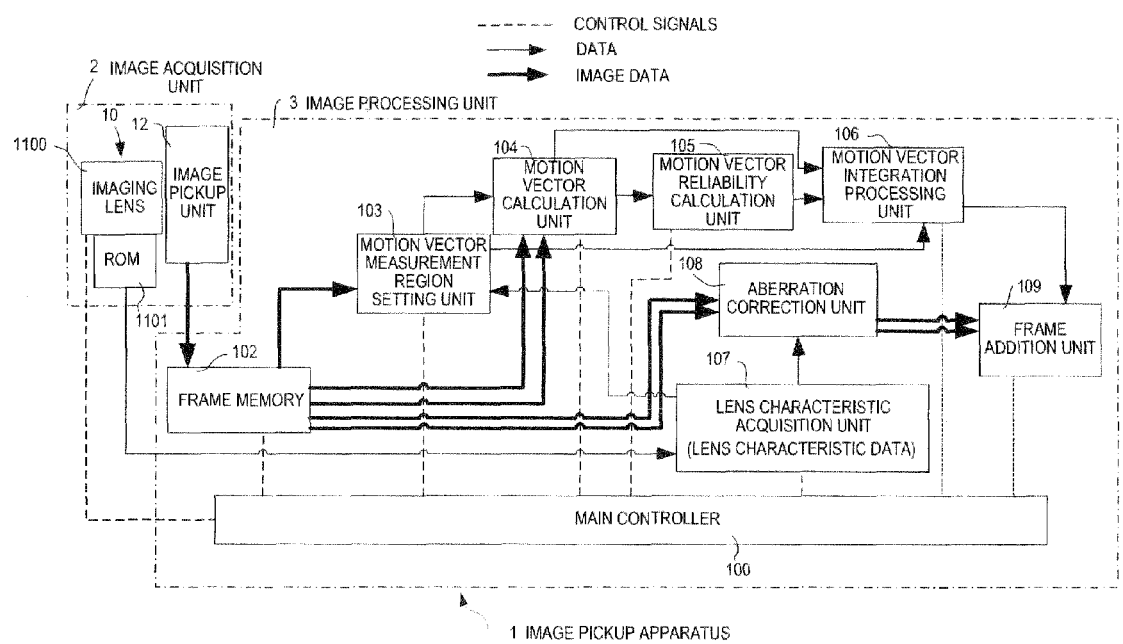
FIG. 2 is a schematic diagram showing an image processing device according to a first embodiment.

Referring to FIG. 2, an image processing device according to a first embodiment will be described. In the first embodiment, it is assumed that the image processing device is integrated with an image acquisition device to form an image pickup apparatus (an electronic image pickup machine) such as a digital camera or a digital video camera. However, this invention is not limited thereto in its application. For example, the image acquisition device and the image processing device may be provided separately and used in tandem.

An image pickup apparatus 1 is constituted by an image acquisition unit 2 serving as the image acquisition device and an image processing unit 3 serving as the image processing device. The image processing unit 3 performs registration processing and addition processing on a plurality of images picked up by the image acquisition unit 2.

The image acquisition unit 2 includes an imaging lens unit 10 and an image pickup unit 12. The imaging lens unit 10 is used to photograph (or pick up) the plurality of images. The imaging lens unit 10 includes an imaging lens (or an image pickup lens) 1100 that is constituted by one or more lens elements and forms light taken in from the outside into images. The imaging lens unit 10 also includes a ROM (read only memory) 1101 attached to the imaging lens 1100 as a storage unit for storing lens characteristic data. The image pickup unit 12 is constituted by an imager (CCD) and a signal processing unit that processing signals from the imager. The image pickup unit 12 converts an optical image formed in the image pickup unit 12 by the imaging lens 100 into an electric signal. Further, the image pickup unit 12 converts the electric signal into a digital signal to generate image data. At this time, processing such as subtracting an optical black (i.e. optical intensity zero) electric signal from the electric signal is performed.

The image processing unit (or image processing device) 3 includes a frame memory 102 that stores the plurality of images, and a motion vector measurement region setting unit 103 that sets a plurality of motion vector measurement regions on a reference image. The motion vector measurement region setting unit 103 sets a centroid position (a central position) of each of the plurality of motion vector measurement regions within a position range of the reference image determined on the basis of the lens characteristic data. As will be described below, the region setting unit 103 may set the motion vector measurement regions such that an entire motion vector measurement region is located within this position range. The position range may be a range in which an absolute value of the aberration is no greater than a predetermined value, for example. The lens characteristic data are obtained from a lens characteristic acquisition unit 107, to be described below. The motion vector measurement region setting unit 103 will be described in detail below.

The image processing unit 3 also includes a motion vector calculation unit 104 that calculates a motion vector of each motion vector measurement region, and a motion vector reliability calculation unit 105 that calculates the reliability of a motion vector calculation result.

The image processing unit 3 also includes a motion vector integration processing unit 106 that calculates a representative value of an inter-frame motion vector on the basis of the above calculated motion vectors, and a frame addition unit 109 that performs image addition in accordance with the representative value. The image processing unit 3 also includes the lens characteristic acquisition unit 107, which obtains the lens characteristic data relating to characteristics of the image pickup lens 1100 from the ROM 1101, and an aberration correction unit 108 that performs aberration correction on the basis of the lens characteristic data.

The image processing unit 3 also includes a main controller 100 that controls the respective units described above. The main controller 100 controls operations of the respective units of the image processing unit 3, and performs autofocus (AF) adjustment control and zoom operation control (magnification modification control) on the imaging lens 1100. The main controller 100 is constituted by a CPU (central processing unit) such as a DSP (digital signal processor) and so on, for example. In FIG. 2, dotted lines denote control signals from the main controller, thin lines denote the flow of data such as motion vectors and reliability values, and thick lines denote the flow of image data. Each unit (or all units) of the image processing unit 3 may be constituted by a logic circuit. Alternatively, each unit (or all units) of the image processing unit 3 may be constituted by a memory for storing data, a memory for storing a calculation program, a CPU (central processing unit) for executing the calculation program, an input/output interface, and so on.

In the following specification, the motion vector measurement region, the motion vector measurement region setting unit, and the motion vector calculation unit will be referred to as a "measurement region", a "region setting unit", and a "vector calculation unit", respectively. Further, the motion vector reliability calculation unit, the motion vector integration processing unit, and the lens characteristic acquisition unit will be referred to as a "reliability calculation unit", an "integration processing unit", and a "characteristic acquisition unit", respectively. The "imaging lens" will occasionally be referred to simply as a "lens". Further, the representative value of the inter-frame motion vector will occasionally be referred to simply as an inter-frame motion vector or a correction vector.

The lens characteristic data stored in the ROM 1101 attached to the imaging lens unit 10 will now be described. The lens characteristic data relate to the lens characteristics of the imaging lens. The lens characteristics include lens identifiers (for example, the model name and serial number of the lens) for identifying the type of the imaging lens 1100, and lens parameters providing the optical characteristics of the imaging lens 1100. Examples of these lens parameters include a focal distance f and a distortion DT (%) of the lens 1100.

The distortion DT (%) is expressed as shown in a following Equation (5) using an actual image height Y' and an ideal image height Y. A relationship between the actual image height Y' and the ideal image height Y is expressed as shown in an Equation (6). Accordingly, coefficients $a_1$, $a_2$, $a_3$ of a polynomial such as that shown in an Equation (7), which is obtained by expanding the distortion DT (%) by the square ($Y^2$) of the ideal image height, may also be cited as examples of other lens parameters relating to the distortion.

$$DT = \frac{Y' - Y}{Y} \times 100 \tag{5}$$

$$Y' = Y\left(1 + \frac{DT}{100}\right) \tag{6}$$

$$Y' = Y(1 + a_1 Y^2 + a_2 Y^4 + a_3 Y^6) \tag{7}$$

Although the coefficients $a_1$, $a_2$, $a_3$ of a polynomial obtained by expanding the distortion DT (%) by the square ($Y^2$) of the ideal image height was cited as an example of a lens characteristic, this invention is not limited thereto, and coefficients of a polynomial obtained by expanding the distortion DT (%) by the ideal image height Y may also be used as a lens characteristic. Hence, when the optical axis is offset or the like, cases in which distortion in the optical system is not symmetric with respect to the center of the image can be dealt with.

Further, the lens parameters may be stored in the ROM 101 in association with arrangement information relating to the imaging lens 1100 so that the characteristic acquisition unit 107 can obtain the lens characteristics in accordance with the imaging lens arrangement information. Accordingly, the region setting unit 103 can determine the aberration in accordance with the lens arrangement information by determining aberration data (image distortion data) for each lens arrangement (in each lens position). For example, the aberration may be determined while also taking into account image displacement during zoom movement or autofocus adjustment of the imaging lens 1100.

Figure 3:
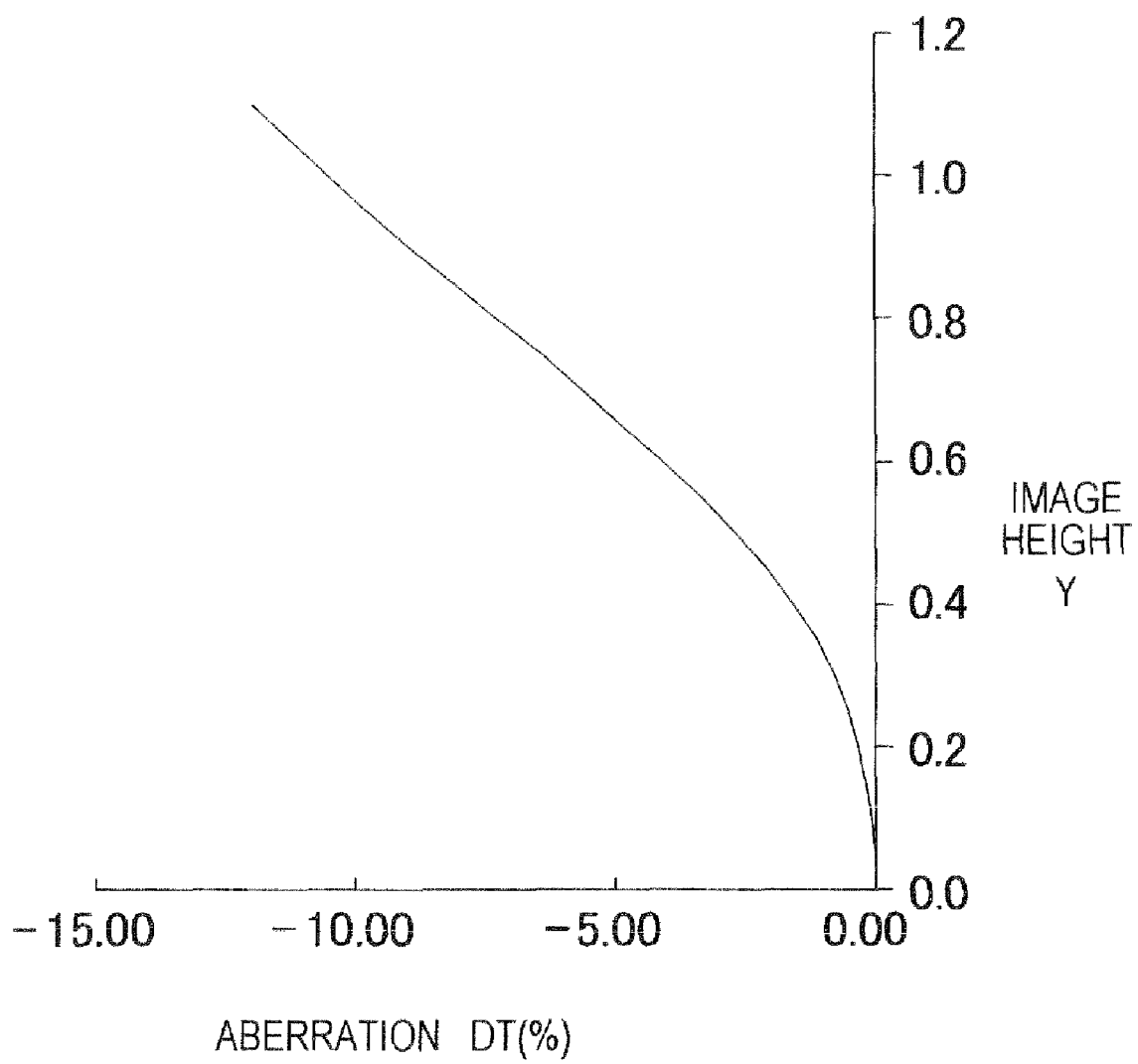
FIG. 3 is a view showing an example of a relationship between an aberration and an image height.

FIG. 3 shows an example of a relationship between the image height and the distortion of an image when barrel distortion exists. In FIG. 3, when the image height is approximately 0.5, the distortion is approximately 2%. At an image height of approximately 0.5, a registration precision between two images remains at three pixels without performing aberration correction on the images, even when the displacement between the images is approximately 150 pixels. Therefore, the registration can be performed such that deviation of the two images is invisible. However, at an image height of 1.0, the distortion is 12%, and therefore the registration precision without performing aberration correction on the images is 18 pixels. Hence, the effects of the motion vector in the measurement regions at this image height must be removed in the calculation of an inter-frame motion vector.

Figure 4A:
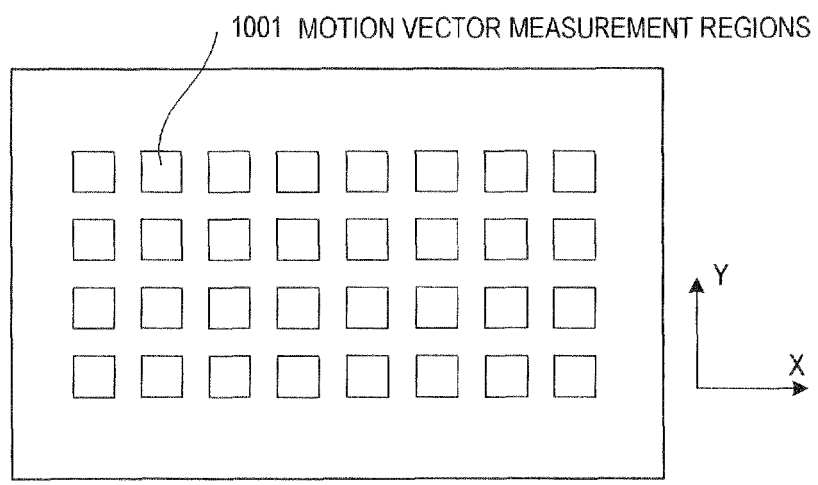
FIG. 4A is a view showing a preset arrangement of measurement regions (blocks).
Figure 4B:
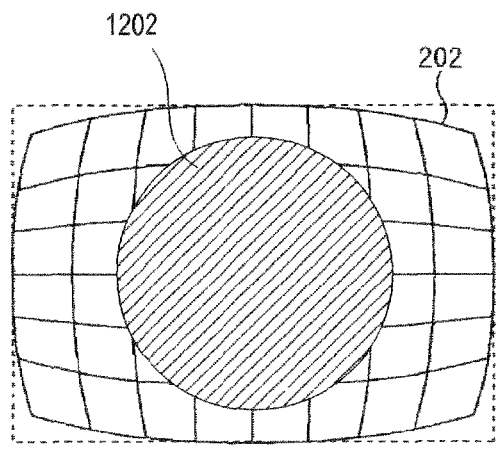
FIG. 4B is a view showing a region having a small absolute value of distortion.
Figure 4C:
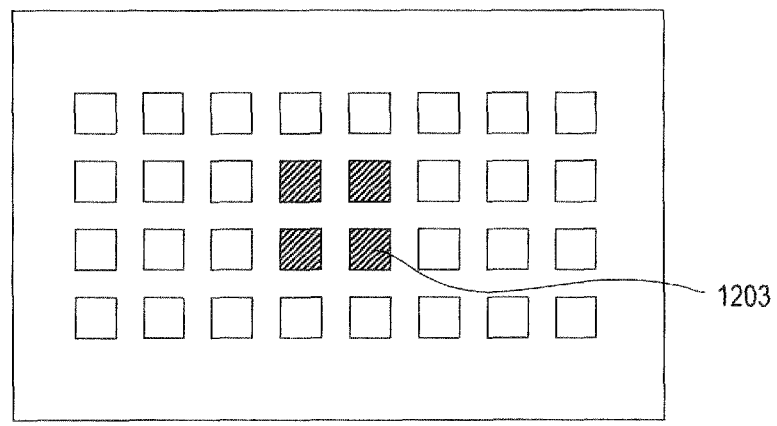
FIG. 4C is a view showing a measurement region (block) in which a motion vector is calculated.

Next, referring to FIGS. 4A-4C, the region setting unit 103 will be described in detail. FIG. 4A shows the positions of two or more (M) predetermined regions (blocks) 1001. FIG. 4B shows a position range 1202 in which an absolute value |DT| of the distortion DT is small. FIG. 4C shows a plurality of (n) measurement regions (blocks) 1203 in which motion vectors are calculated.

In the manner described below, the region setting unit 103 selects/sets a plurality of motion vector measurement regions having a centroid position (or a central position) in the position range 1202 determined on the basis of the lens characteristic data.

First, the region setting unit 103 calculates an image height Ym, a square of the image height $Ym^2$, or the like of the centroid position of a measurement region on the basis of a center (x0, y0) of a photographed image and centroid positions Bm=(bxm, bym) (m=1 to M) of the at least two predetermined regions 1001. Here, the image height is a distance from the center of the image, which serves as an index of the position of the measurement region. The center of the image is a position corresponding to an intersection between the optical axis of the imaging lens and an image plane on the image pickup unit 12. It should be noted that the position of the center of the image (image height 0) does not have to match the central position of a reference image or a subject image used during registration processing. For example, the reference image or the subject image may be partially trimmed (cut away) before performing the registration processing, and in this case, the center of the image does not match the center of the reference image or subject image.

Next, the region setting unit 103 determines the distortion DT from the image height Ym or the square $Ym^2$ of the image height and the coefficients $a_1$, $a_2$, $a_3$ serving as the lens characteristic data, and determines the position range 1202 in the reference image on the basis of the distortion DT. More specifically, the region setting unit 103 determines a position range in which the absolute value of the distortion |DT| is equal to or smaller than a predetermined value. The predetermined value is set between 2% and 3%, for example, but is not limited thereto. Next, the region setting unit 103 selects a plurality of measurement regions 1203 having a centroid position located within the position range 1202 from the two or more predetermined regions 1001 of the reference image.

Figure 5:
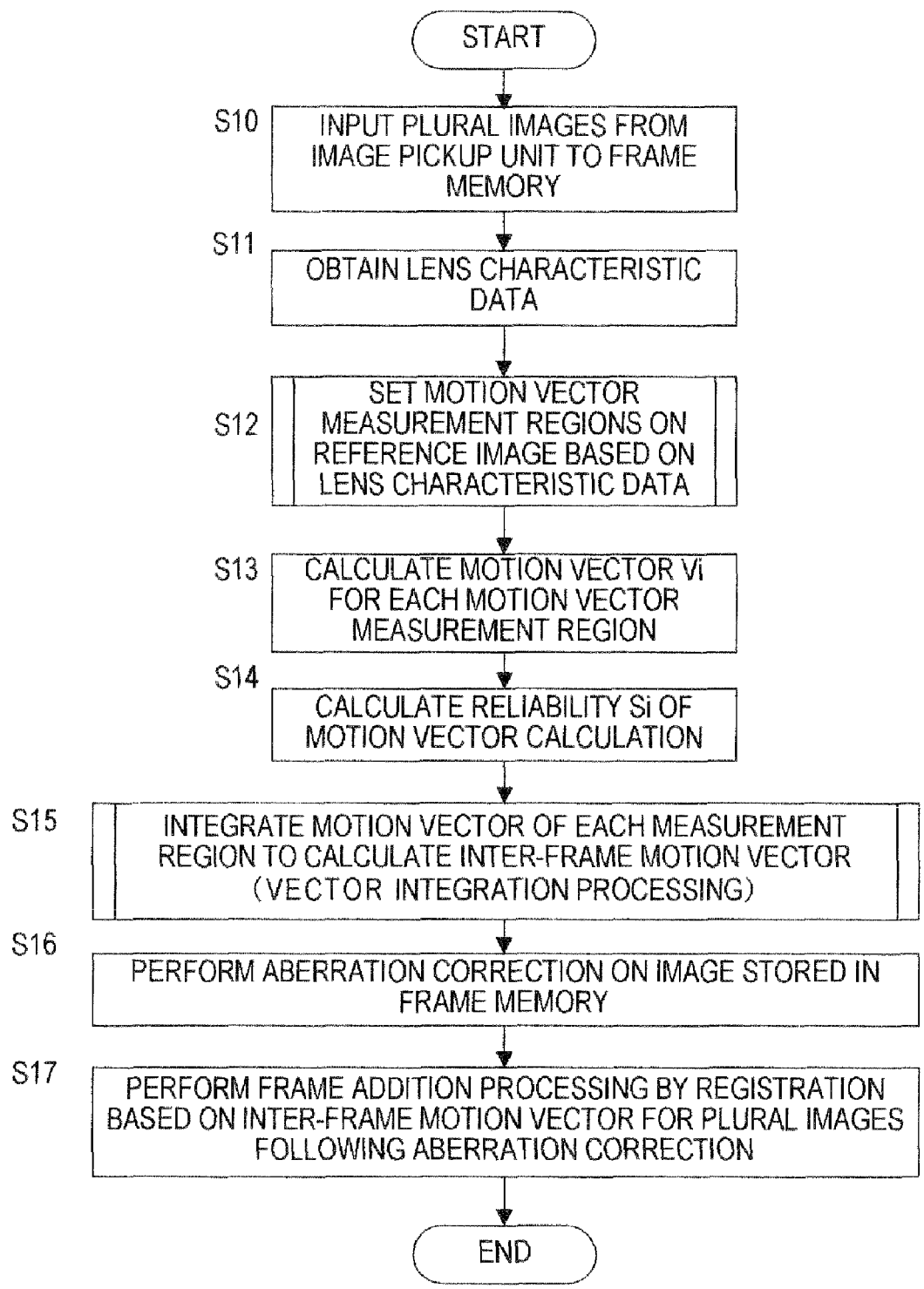
FIG. 5 is a flowchart showing an image processing procedure according to the first embodiment.

Next, referring to a flowchart shown in FIG. 5, an image processing procedure performed by the image processing unit 3 will be described.

In a step S10, the frame memory 102 temporarily stores image data relating to a plurality of images input from the image pickup unit 12.

In a step S11, the characteristics acquisition unit 107 obtains the lens characteristic data of the imaging lens 1100 from the ROM 1101 serving as the storage unit. The lens characteristic data are used for measurement region setting by the region setting unit 103 and distortion correction by the aberration correction unit 108. Here, lens identification may be performed on the basis of the lens identification information (for example, the model name and serial number of the lens) stored in the ROM 101.

In a step S12, the region setting unit 103 selects a plurality of measurement regions 1203 each having a centroid located within the position range determined on the basis of the lens characteristic data from the two or more predetermined regions 1001 in the reference image. For example, the region setting unit 103 sets blocks in a grid pattern on the reference image (see FIG. 4A) as the two or more (M) predetermined regions 1001. The region setting processing performed in the step S12 will be described in detail below.

In a step S13, the vector calculation unit 104 calculates a motion vector between the reference image (or reference frame) serving as an image for reference and a subject image (or subject frame) serving as a comparison subject image. The vector calculation unit 104 calculates a relative positional displacement between a measurement region of the reference image and a region of the subject image that has the highest correlation with the measurement region, as a motion vector. Here, the vector calculation unit 104 uses the image data of the reference image and subject image, which is stored in the frame memory 102, and data relating to the measurement regions set by the region setting unit 103. To detect the region having the highest correlation, the vector calculation unit 104 uses a correlation calculation such as the sum of squared difference SSD, the sum of absolute difference SAD, or a normalized cross-correlation NCC.

In a step S14, the reliability calculation unit 105 calculates a reliability Si (i=1 to n) of the motion vector calculated in relation to each measurement region 1203. The reliability Si is an index indicating the accuracy of the motion vector calculation result obtained by the vector calculation unit 104. A method of calculating the motion vector reliability will be described in detail below.

In a step S15, the integration processing unit 106 integrates the motion vector data of each measurement region to calculate a correction vector serving as a single representative value of an inter-frame motion vector. This calculation is performed on the basis of data relating to the motion vectors calculated by the vector calculation unit 104 and the reliability values calculated by the reliability calculation unit 105. Here, in contrast to the conventional technique described in JP2007-129587A, the correction vector is determined in relation to an image that has not yet undergone distortion correction, and therefore aberration correction and motion vector calculation can be parallelized, as shown in FIG. 2. Motion vector integration processing will be described in detail below.

In a step S16, the aberration correction unit 108 performs distortion correction on the image data stored in the frame memory 102. The distortion correction is performed by determining the ideal image height Y from the actual image height Y' using Equation (6) or Equation (7) and converting the actual image height Y' into the ideal image height Y. It should be noted that this processing is not limited to the sequence shown in the flowchart of FIG. 5, and the motion vector calculation and vector integration processing of the steps S12-S15 may be executed in parallel with the aberration correction of the step S16.

In a step S17, the frame addition unit 109 performs frame addition processing by registration based on the calculated correction vector for the reference image and subject image following aberration correction. In the frame addition processing, shift processing is performed by a shift of the subject image with respect to the reference image by an amount corresponding to the correction vector. Following registration through the shift processing, the pixel values of the reference image and the subject image are added together. So-called super-resolution processing and the like may then be performed using a synthesized image obtained from the frame addition processing.

Figure 6:
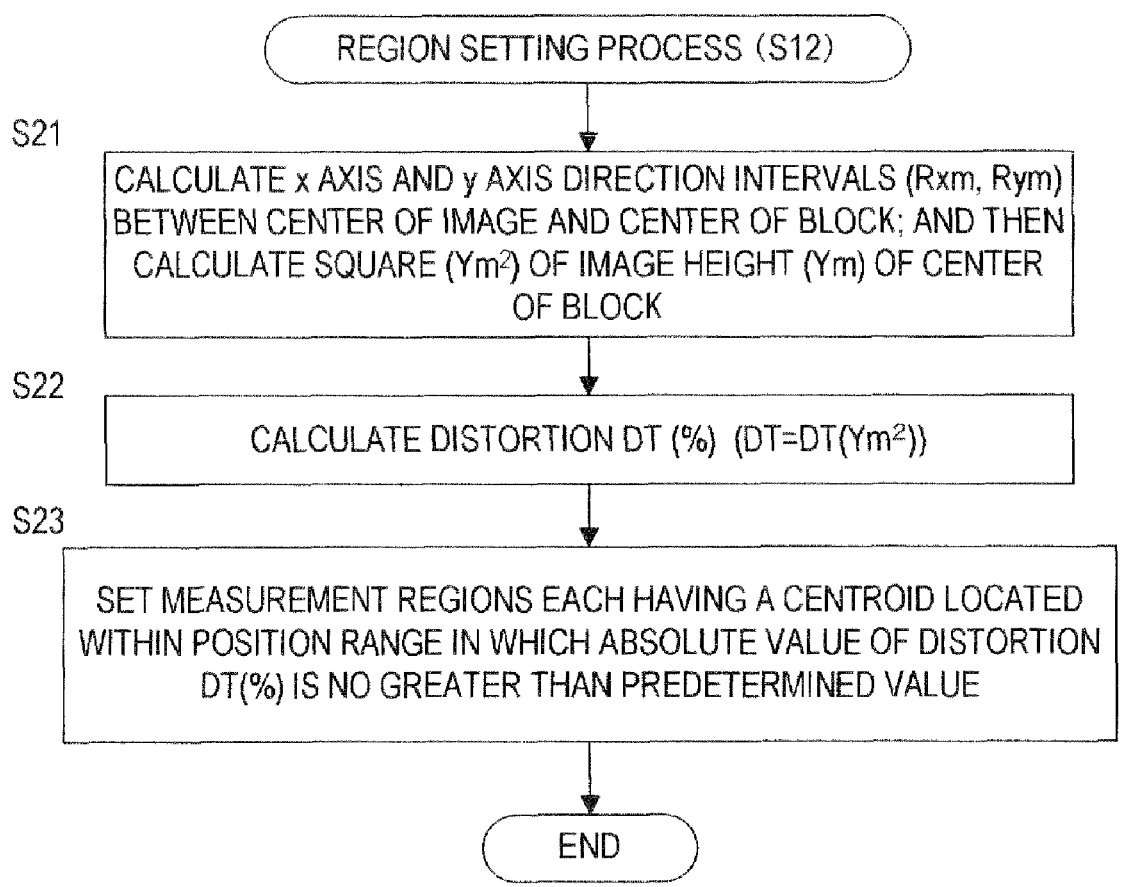
FIG. 6 is a flowchart showing a region setting processing procedure according to the first embodiment.

Next, referring to a flowchart shown in FIG. 6, the region setting processing procedure of the step S12 will be described in detail.

In a step S21, the region setting unit 103 performs the calculations of an Equation (8). First, the region setting unit 103 reads the centroid positions Bm=(bxm, bym) (m=1 to M) of the blocks set in a grid pattern as the two or more regions 1001 from a memory of the image processing unit 3. The region setting unit 103 then calculates x axis and y axis direction intervals Rxm, Rym between the center of the image and the centroid of each block from the central position (x0, y0) of the image and the centroid positions Bm=(bxm, bym) of the blocks. Further, the region setting unit 103 calculates the square $Ym^2$ of the image height Ym of the centroid (center) of an $m^{th}$ block or the like from the intervals Rxm, Rym.

$$Rxm = bxm - x0$$

$$Rym = bym - y0$$

$$Ym^2 = Rxm^2 + Rym^2 \qquad (8)$$

The region setting unit 103 may calculate the image height Ym for each block number m at the time of block setting and store a reference table indicating the relationship between the number m and the image height Ym in the memory of the image processing unit 3. In this case, the region setting unit 103 can obtain the pre-calculated image height Ym from the block number m by referring to the reference table as necessary.

In a step S22, the region setting unit 103 reads the lens parameters $a_1, a_2, a_3$ obtained by the characteristic acquisition unit 107, and calculates the distortion DT (%) from the square $Ym^2$ of the image height determined in the step S21 using an Equation (9).

$$\begin{aligned} DT &= 100(a_1 Ym^2 + a_2 Ym^4 + a_3 Ym^6) \\ &= 100(a_1(Ym^2) + a_2(Ym^2)^2 + a_3(Ym^2)^4) \\ &= D(Ym^2) \end{aligned} \qquad (9)$$

As shown in Equation (9), the distortion DT (%) may be obtained as a function of $YM^2$.

In another method, the region setting unit 103 may obtain a distortion DT (Ym) from the image height Ym (=$(Rxm^2+Rym^2)^{1/2}$) by referring to a reference table that provides a relationship between the image height Y and the distortion DT.

In a step S23, the region setting unit 103 uses the distortion to obtain an evaluation value which is an absolute value of the distortion |DT (Ym)|(m=1 to M), for example, and determines whether or not the evaluation value is no greater than a predetermined value in relation to each of the blocks (regions 1001) set in the grid pattern. The region setting unit 103 then selects blocks in which the absolute value of the distortion |DT (Ym)| is no greater than the predetermined value as the measurement regions 1203. Thus, a plurality of (n) measurement regions 1203 having a centroid (center) located within a position range in which the absolute value of the distortion is no greater than the predetermined value, are set from the two or more predetermined regions 1001. As a result, the effects of the distortion can be removed before aberration correction, making it possible to determine the inter-frame motion vector accurately. It should be noted that the absolute value of the distortion |DT (Ym)| decreases steadily toward the center of the image, and therefore a plurality of measurement regions 1203 located close to the center (x0, y0) of the image are selected.

Next, the motion vector reliability calculation of the step S13 will be described in detail.

Various methods of calculating the reliability of a motion vector are known. Here, the reliability is calculated on the basis of a correlation value between a measurement region of the reference image and a corresponding image region of the subject image. The sum of squared difference SSD of a difference between pixel values included in a block Ii (measurement region) of the reference image and a corresponding block Ij of the subject image, for example, is used as the correlation value. The sum of squared difference SSD is expressed by a following Equation (10).

$$SSD(i, j) = \sum_{p \in Ii, q \in Ij} (Lp - Lq)^2 \qquad (10)$$

$$Ii = \begin{cases} x \in \left(bxi - \frac{1}{2}h,\ bxi + \frac{1}{2}h\right) \\ y \in \left(byi - \frac{1}{2}v,\ byi + \frac{1}{2}v\right) \end{cases}$$

$$Ij = \begin{cases} x \in \left(bxi + bxj - \frac{1}{2}h,\ bxi + bxj + \frac{1}{2}h\right) \\ y \in \left(byi + byj - \frac{1}{2}v,\ byi + byj + \frac{1}{2}v\right) \end{cases}$$

Here, Lp, Lq are pixel values (or luminance levels) of pixels in positions p, q, respectively. The pixel values may be measured by measuring R (red), G (green) and B (blue) independently or by measuring a Y signal obtained by converting an RGB color space into a YCrCb color space. Coordinates (bxi, byi) indicate a central position (or a centroid position) of an $i^{th}$ block selected/set as a measurement region by the region setting unit 103, and are prepared in a number corresponding to the number n of the plurality of selected/set blocks. Horizontal and vertical direction sizes of the block are indicated by h, v, respectively. Coordinates (bxj, byj) indicate a central position of a $j^{th}$ block (subject block) of the subject image corresponding to the block of the reference image, and are prepared in accordance with a block matching search range.

A sum of squared difference SSD (i, j) of the $i^{th}$ block takes various values depending on the subject block number j, and a reliability Si of the motion vector of the $i^{th}$ block is determined on the basis of a difference between a minimum value and an average value of the SSD (i, j) For example, the reliability Si may be set as the difference between the minimum value and the average value of the SSD (i, j).

A reliability based on a statistical property of the correlation value SSD is associated with the structural characteristics of the region and the following concepts. (i) In a region having a sharp edge structure, the reliability of the motion vector calculated in relation to that region is high, and as a result, an error in the position of a block of the subject image indicating the minimum value of the SSD is small. When the SSD is plotted on a histogram, small SSDs are concentrated in the vicinity of the position indicating the minimum value. Hence, the difference between the minimum value and average value of the SSD is large. (ii) In the case of a textured or flat structure, the SSD histogram becomes flat, and as a result, the difference between the minimum value and average value of the SSD is small and the reliability is low. (iii) In the case of a repeated structure, the positions of subject blocks indicating the minimum value and maximum value of the SSD are close, whereas positions indicating small SSD values are dispersed. As a result, the difference between the minimum value and the average value is small, and the reliability is low. Thus, a highly reliable motion vector corresponding to the $i^{th}$ block is selected on the basis of the difference between the minimum value and average value of the SSD (i, j).

It should be noted in relation to the reliability that the reliability may be determined from an edge amount of each block.

Figure 7:
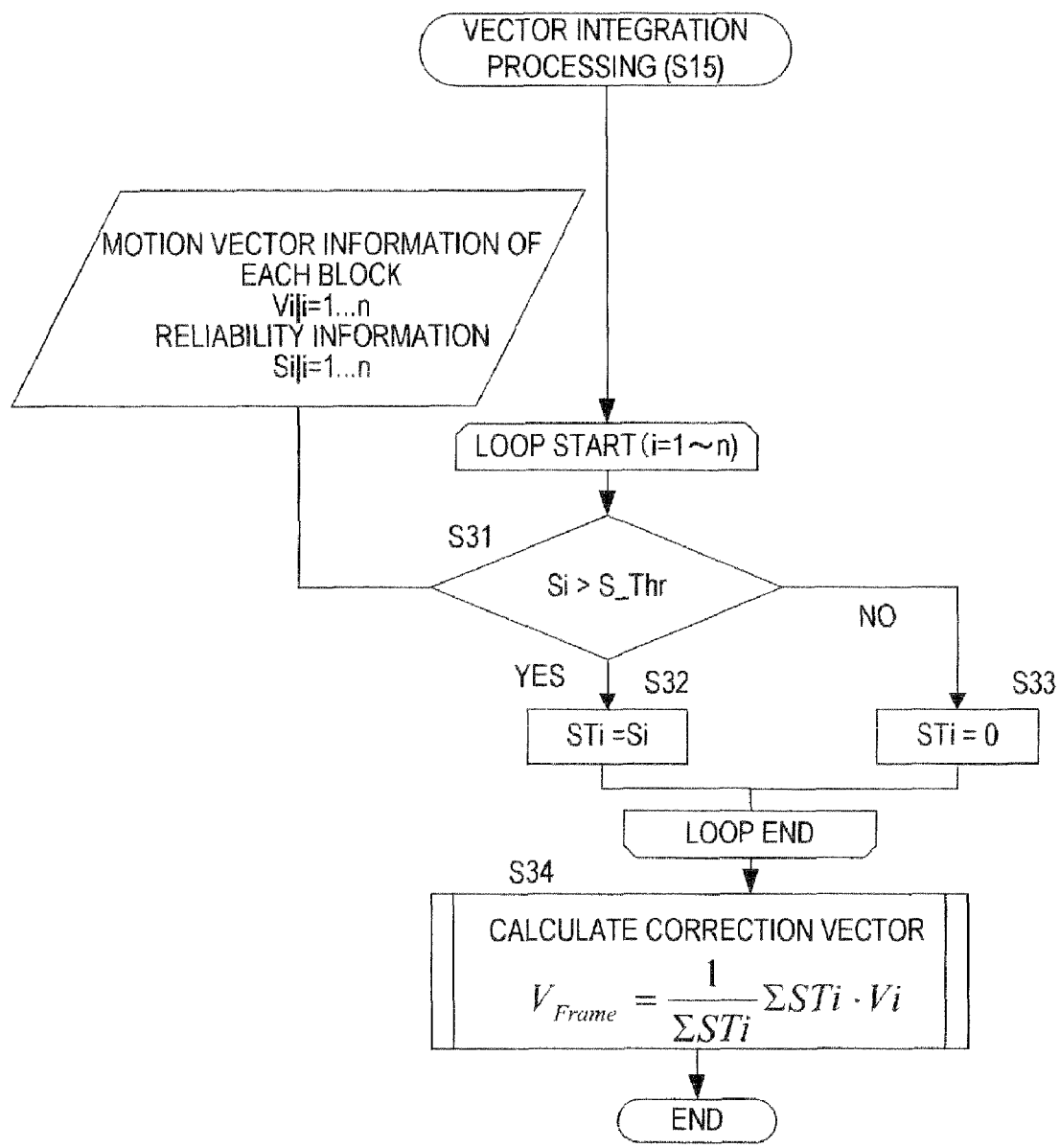
FIG. 7 is a flowchart showing an integration processing procedure according to the first embodiment.

FIG. 7 is a flowchart showing the integration processing performed by the integration processing unit 106 in the step S15.

In a step S31, a determination is made as to whether or not the reliability Si is greater than a prescribed value S_Thr. When the reliability Si is greater than the prescribed value S_Thr, the reliability Si that is greater than the prescribed value is maintained as is and set as a conclusive reliability STi in a step S32. When the reliability Si is equal to or smaller than the prescribed value S_Thr, the conclusive reliability STi is set at 0 in a step S33 in order to set the contribution of a motion vector having a reliability Si that is equal to or smaller than the prescribed value at 0. Thus, the conclusive reliability STi used to calculate a correction vector $V_{frame}$ is determined. In so doing, a motion vector integration result is stabilized, or in other words an accurate correction vector is determined.

In a step S34, the correction vector $V_{Frame}$ is calculated from the conclusive reliability STi and a motion vector Vi of the $i^{th}$ measurement region. More specifically, the correction vector $V_{Frame}$ is calculated by performing weighted addition on (or calculating a weighted average of) the motion vector Vi in accordance with the conclusive reliability STi, as shown in an Equation (11).

$$V_{Frame} = \frac{1}{\Sigma STi} \Sigma STi \cdot Vi \quad (11)$$

Here, a right side denominator ΣSTi is a normalization coefficient. A weighting coefficient (STi/ΣSTi) is set in accordance with the conclusive reliability STi. Thus, the correction vector $V_{Frame}$ can be calculated appropriately, taking into account the reliability STi. In other words, the inter-frame motion vector (correction vector) can be calculated accurately by reducing the effect of measurement region motion vectors having a low reliability and increasing the effect of measurement region motion vectors having a high reliability.

Hence, in the steps S31-S34, the motion vector Vi is weighted on the basis of the reliability Si and added up, whereby the correction vector $V_{Frame}$ is calculated. Instead of performing the processing of the steps S31-S33, the correction vector $V_{Frame}$ may be calculated by using the initial reliability Si in Equation (11) in place of the conclusive reliability STi.

In the first embodiment described above, the centroid positions of a plurality of measurement regions are set in a position range having a small absolute value of the aberration, which is determined on the basis of the image height (the positions of the measurement regions) and lens characteristics relating to distortion. Further, an inter-frame motion vector (correction vector) is calculated by integrating the motion vectors of the plurality of measurement regions. In the plurality of measurement regions, the absolute value of the aberration is small, and therefore the accuracy of the motion vector calculation is high. Hence, the correction vector $V_{Frame}$ can be calculated accurately using only the motion vectors of the aforementioned plurality of measurement regions and excluding the motion vectors of the other regions.

Thus, the inter-frame motion vector can be determined accurately by removing the effects of the aberration on the plurality of images prior to aberration correction. As a result, a more accurate inter-frame motion vector can be determined than in a case where an inter-frame motion vector is determined in relation to images that have been subjected to aberration correction when the aberration correction is inaccurate. Moreover, by image transformation (image shift here) defined by the accurate inter-frame motion vector, image registration processing can be performed with a high degree of precision.

In the first embodiment, distortion is used as an example of the aberration, but the first embodiment may of course be applied to an aberration other than distortion (field curvature or the like). For example, when the relationship between the image height Y (or the position of the measurement region) and the aberration DT is known, any type of aberration can be determined as shown in FIG. 6, whereupon the measurement regions are set in a position range in which the aberration is small. By integrating the motion vectors of these measurement regions, the inter-frame motion vector can be calculated.

Further, in the first embodiment, the region setting unit 103 sets the centroid positions of the measurement regions to lie within the position range in which the absolute value of the aberration is small. However, the measurement regions may be set such that the entire measurement region is located within the position range. In so doing, the effects of the aberration can be eliminated more effectively, the calculation precision of the motion vectors of the respective measurement regions 1203 can be increased, and the inter-frame motion vector can be determined more accurately. For example, even if the centroid of the region (block) 1001 enters the position range, the region 1001 is selected as a measurement region 1203 only when a boundary of the position range does not pass through the region 1001.

Further, a case in which the lens parameters of the lens 1100 are stored in the ROM 1101 attached to the imaging lens was described above. However, the lens parameters may be stored in the internal memory of the image processing unit such that lens parameters corresponding to the lens type are read from the memory after determining the lens type.

[Modified Example of First Embodiment]

Figure 8:
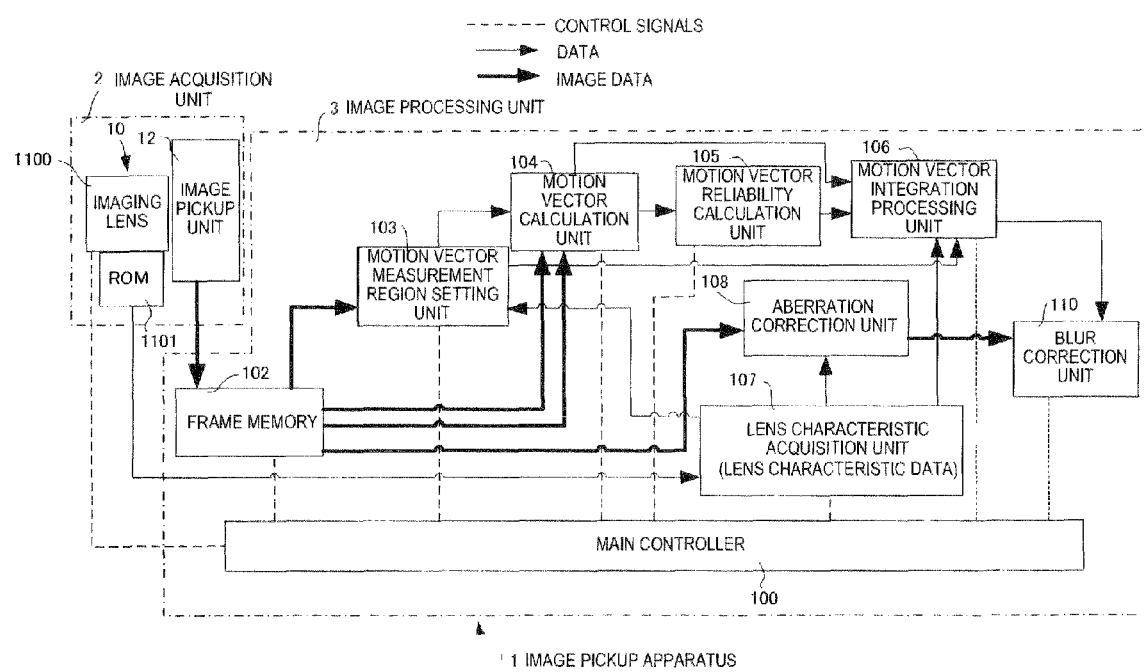
FIG. 8 is a schematic diagram showing a modified example of the image processing device according to the first embodiment.

Next, a modified example of the first embodiment will be described with reference to FIG. 8. FIGS. 2 and 5 show an example of frame addition, but instead of frame addition, blur correction of a moving image may be performed. FIG. 8 is a constitutional diagram showing a case in which blur correction of a moving image is performed to position a subject image relative to a reference image on the basis of a correction vector. In FIG. 8, a frame blur correction unit 110 shifts the subject image relative to the reference image in order to reduce blur, and transfers subject image data to a display device or a storage device not shown in the drawing.

This modified example may of course be applied to an aberration other than distortion.

[Second Embodiment]

In a second embodiment, the region setting processing (the step S12 of FIG. 5) differs from that of the first embodiment, but all other constitutions are identical to the first embodiment.

In the first embodiment, the plurality of measurement regions 1203 are set in the position range determined on the basis of the lens characteristic data. This position range is a range in which the absolute value of the aberration is equal to or smaller than a predetermined value.

In the second embodiment, on the other hand, the position range is set as a range in which a distance from the center of the image (the image height Y) is equal to or smaller than a threshold Yr. More specifically, the region setting unit 103 sets the centroid positions of the plurality of measurement regions 1203 within a circular position range in which the distance from the image center is no greater than the threshold Yr. The reason for this is that typically, the absolute value of the aberration tends to be large in positions away from the image center. Referring to FIG. 3, for example, the absolute value of the distortion |DT| decreases steadily as the image height Y of an image surface 202 decreases.

The threshold Yr is determined in accordance with the focal distance f of the lens and the lens type, which is learned from the lens identifiers. Thus, the centroid positions of the plurality of measurement regions 1203 are set within a position range determined on the basis of the lens type and focal distance f which serve as the lens characteristic data.

Next, a reference for determining the threshold Yr in accordance with the lens type will be described. Tables 1 and 2 show examples of distortion characteristics in typical imaging lenses.

TABLE 1

TABLE OF IMAGE HEIGHT AND DISTORTION
IN 28 mm LENS (f = 28 mm)

| IMAGE HEIGHT Y | DISTORTION DT (%) |
|---|---|
| 0 | 0 |
| 0.2 | −0.2 |
| 0.4 | −1.5 |
| 0.6 | −2.5 |
| 0.8 | −6 |
| 1.0 | −12 |

TABLE 2

TABLE OF IMAGE HEIGHT AND DISTORTION
IN 50 mm LENS (f = 50 mm)

| IMAGE HEIGHT Y | DISTORTION DT (%) |
|---|---|
| 0 | 0 |
| 0.2 | −0.1 |
| 0.4 | −0.4 |
| 0.6 | −0.6 |
| 0.8 | −1 |
| 1.0 | −2.2 |

It should be noted that here, a value normalized by a maximum value is used as the image height.

In this example, when the imaging lens is a 28 mm lens, the threshold Yr is set at 0.5, and when the imaging lens is a 50 mm lens, the threshold Yr is set at 0.9. Hence, the centroid positions of the measurement regions are set in a position range in which the distortion is no more than approximately 2%. Furthermore, as the focal distance f of the imaging lens increases, the distortion decreases and therefore the threshold Yr is set to be steadily larger. Hence, the measurement regions can be determined accurately in accordance with the focal distance f, enabling accurate calculation of the inter-frame motion vector.

The memory of the image processing unit 3 stores a reference table used to determine the relationship between the lens type (or the focal distance f) and the threshold Yr. Table 3 shows an example of a reference table, but the reference table is not limited to this example. The region setting unit 103 can determine a threshold Yr corresponding to the lens type (or the focal distance f) by referring to the reference table.

TABLE 3

EXAMPLE OF REFERENCE TABLE

| LENS TYPE (OR FOCAL DISTANCE f) | THRESHOLD Yr |
|---|---|
| LENS 1 (28 mm LENS) | 0.5 |
| LENS 2 (35 mm LENS) | 0.6 |
| LENS 3 (50 mm LENS) | 0.9 |

When the imaging lens is a zoom lens, the threshold Yr corresponding to the focal distance f may be calculated on the basis of a function for determining the relationship between the focal distance f and the threshold Yr. By setting the threshold Yr to be larger as the focal distance f of the imaging lens increases, the measurement regions can be determined accurately in accordance with the focal distance f even during zooming, enabling accurate calculation of the inter-frame motion vector.

Figure 9:
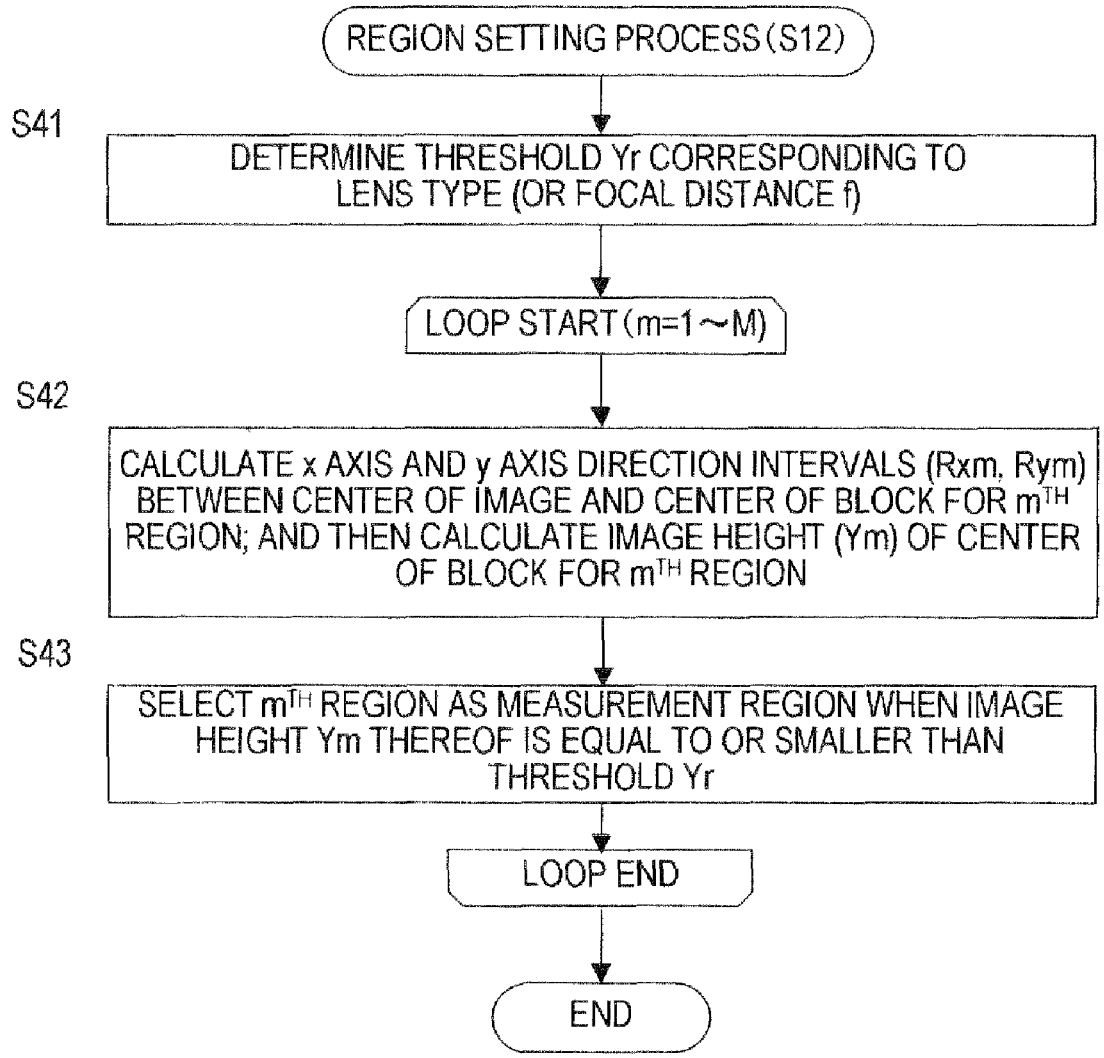
FIG. 9 is a flowchart showing a region setting processing procedure according to a second embodiment.

Next, referring to a flowchart shown in FIG. 9, a region setting processing procedure (the step S12 in FIG. 5) according to the second embodiment will be described.

In a step S41, a threshold Yr corresponding to the lens type (or the focal distance f) is determined on the basis of the reference table. In the step S42, the image height Ym is calculated on the basis of Equation (8). In a step S43, an operation is performed on each number m to select the $m^{th}$ region 1001 as a measurement region 1203 when the image height Ym thereof is equal to or smaller than the threshold Yr.

Hence, in the second embodiment, the region setting unit 103 sets the plurality of measurement regions 1203 on the basis of the lens characteristic data and the distance from the center of the image. Therefore, a special calculation of the distortion is not necessary, and the plurality of motion vector measurement regions can be set easily. More specifically, as long as a relationship between the lens type and the threshold Yr or a relationship between the focal distance f and the threshold Yr are determined in advance, the position range in which the plurality of measurement regions are set can be determined without specifically calculating the distortion.

In the second embodiment, distortion is used as an example of the aberration, but the second embodiment may of course be applied to an aberration other than distortion. For example, as long as the relationship between the lens type (or the focal distance f) and the threshold Yr is determined in advance on the basis of the aberration, as shown in Table 3, the position range in which the plurality of measurement regions are set, can be determined. Hence, even when an aberration other than distortion exists, the inter-frame motion vector can be calculated by integrating the motion vectors of the measurement regions.

Further, the region setting unit 103 sets the centroid positions of the measurement regions so as to lie within the position range, but the measurement regions may be set such that the entire motion vector measurement region is located within the position range.

[Third Embodiment]

Next, a third embodiment will be described with reference to FIGS. 10 and 11. In the first embodiment, the correction vector $V_{Frame}$ (inter-frame motion vector) is determined by weighting the motion vectors (Equation (11)), but in the third embodiment, the correction vector is determined using a different method. All other constitutions are identical to the first embodiment.

In the third embodiment, the correction vector is determined on the basis of an appearance frequency of a highly reliable motion vector. A frequency distribution (or a histogram) is determined by separating the motion vectors $Vi=(xi, yi)$ into bins (classes). The vector having the highest appearance frequency on the frequency distribution is set as a representative vector representing inter-frame motion, and the representative vector is employed as the correction vector. As will be described below, the reliability STi is taken into consideration when counting the appearance frequency.

Figure 10:
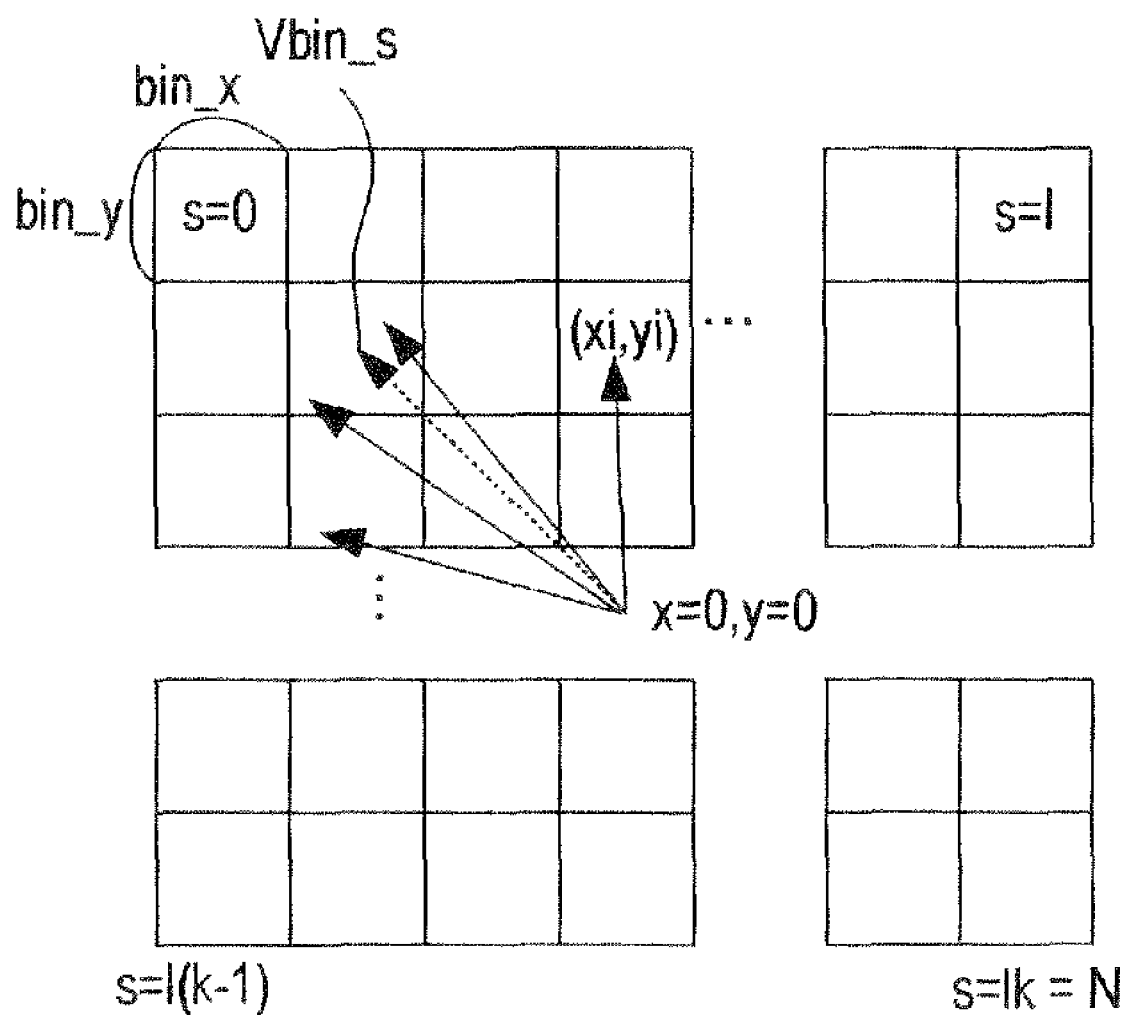
FIG. 10 is a view showing a motion vector classification method and frequency distribution creation according to a third embodiment.

As shown in FIG. 10, the bins relating to the motion vectors Vi are two-dimensional and here take a square shape in which an x-axis direction width is bin_x and a y-axis direction width is bin_y. When horizontal/vertical direction coordinates of the motion vector Vi are set as xi, yi and xi, yi are located within an $s^{th}$ (s=0 . . . N|(N=1×m)) bin, the appearance frequency of the bin is increased. In other words, the motion vectors Vi classified in the $s^{th}$ bin are separated into the $s^{th}$ bin and quantized to a central (centroid) vector $V_{bin\_s}$ of the $s^{th}$ bin.

Figure 11A:
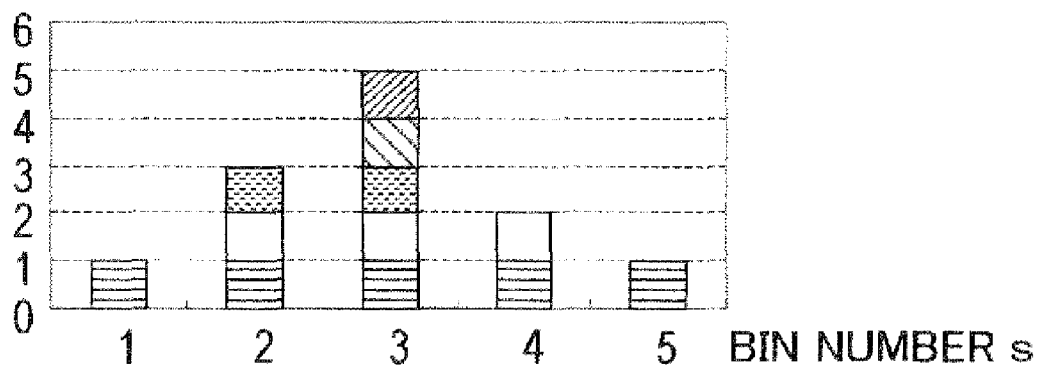
FIG. 11A is a view showing a normal frequency distribution (histogram).
Figure 11B:
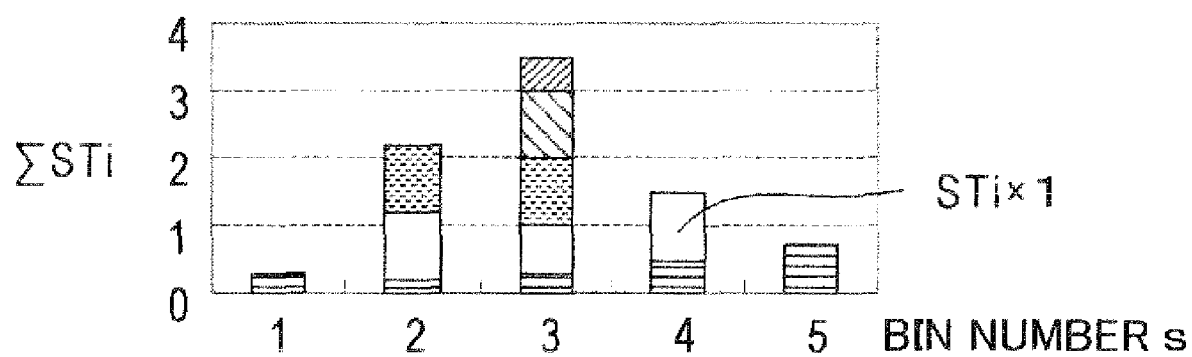
FIG. 11B is a view showing a frequency distribution taking into account motion vector reliability.

As shown in FIG. 11A, on a normal frequency distribution, the appearance frequency is increased by one when the motion vector Vi enters the $s^{th}$ bin. In this embodiment, however, the reliability STi is taken into consideration. As shown in FIG. 11B, when the motion vector Vi enters the $s^{th}$ bin, the appearance frequency of the bin is increased by (STi×1). Accordingly, the ordinate of FIG. 11B shows a sum total (ΣSTi) of the reliability values STi of the motion vectors Vi belonging to a certain bin. It should be noted that in FIG. 11B, the reliability STi is normalized by a maximum reliability such that STi is no greater than 1.

In the third embodiment, as shown in FIG. 11B, the correction vector $V_{Frame}$ is determined using a frequency distribution determined by counting the appearance frequency of the motion vector Vi regarded as the reliability STi. On this frequency distribution, the central vector $V_{bin\_s}$ (here, $V_{bin\_s}$ (s=3)) of the bin having the greatest appearance frequency is set as the correction vector $V_{Frame}$. In other words, when the sum total (ΣSTi) of the reliability values STi relating to the motion vectors Vi separated into an identical bin is at a maximum, the central vector $V_{bin\_s}$ of that bin is set as the correction vector $V_{Frame}$. In the above description, the central vector $V_{bin\_s}$ is shown as an example of a vector (class value) representing a bin (class), and therefore a vector other than the central vector $V_{bin\_s}$ may be set as the vector representing the bin.

Hence, in the third embodiment, an inter-frame motion vector having the maximum sum total of the reliability can be determined. As a result, an appropriate inter-frame motion vector is calculated by excluding the effects of the motion vectors Vi having a low reliability.

It should be noted that the inter-frame motion vector having the maximum sum total of the reliability may be determined using the initial reliability Si instead of the conclusive reliability STi. Further, the third embodiment may of course be applied to an aberration other than distortion.

[Fourth Embodiment]

Next, a fourth embodiment will be described with reference to FIGS. 12 and 13. In the first to third embodiments, a correction vector, which is a single inter-frame vector, is calculated. Registration is then performed between the reference image and the subject image by a shift of the subject image with respect to the reference image by an amount corresponding to the correction vector. In other words, in the first to third embodiments, the subject image is positioned through transformation taking into account only a transformation parameter relating to shift (horizontal shift/vertical shift).

In the fourth embodiment, on the other hand, a transformation parameter other than shift is calculated on the basis of a plurality of inter-frame motion vectors such that registration of the images is performed through transformation taking into account the transformation parameter other than shift. All other constitutions are identical to the first embodiment.

In so doing, rotary movement and the like can be taken into account as inter-frame transformation as well as shift such that in certain cases, the reference image and subject image can be positioned more appropriately than when transformation is performed using only shift based on a correction vector. The transformation parameter other than shift may be determined on the basis of a plurality of different inter-frame vectors.

In this embodiment, an example in which registration of the images is performed through transformation using a projective transformation, will be described. Examples of image transformation are shown below in (A) to (C). In a Euclidean transformation of (A) and an affine transformation of (B), the number of transformation parameters is smaller than the eight parameters of a normal projective transformation, but these are special examples of projective transformation that are included in the category of projective transformation.

(A) Three parameters: Euclidean transformation (transformation synthesized from horizontal shift, vertical shift, and rotation).

(B) Six parameters: Affine transformation (transformation synthesized from horizontal shift, vertical shift, rotation, scaling, reflection, and shearing).

(C) Eight parameters: Normal projective transformation.

It should be noted that these are representative examples, and other transformations may be performed.

Figure 12:
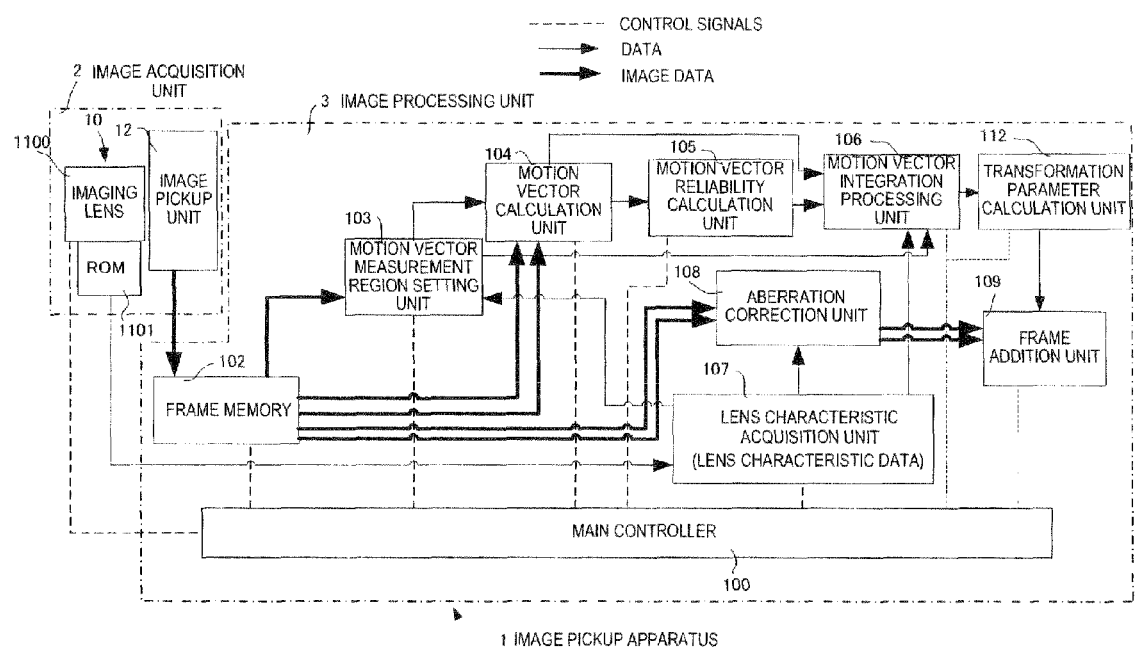
FIG. 12 is a schematic diagram showing an image processing device according to a fourth embodiment.

In FIG. 12, a transformation parameter calculation unit 112 calculates the transformation parameters. The frame addition unit 109 performs registration of the subject image relative to the reference image by transforming the subject image using the calculated transformation parameters.

Figure 13:
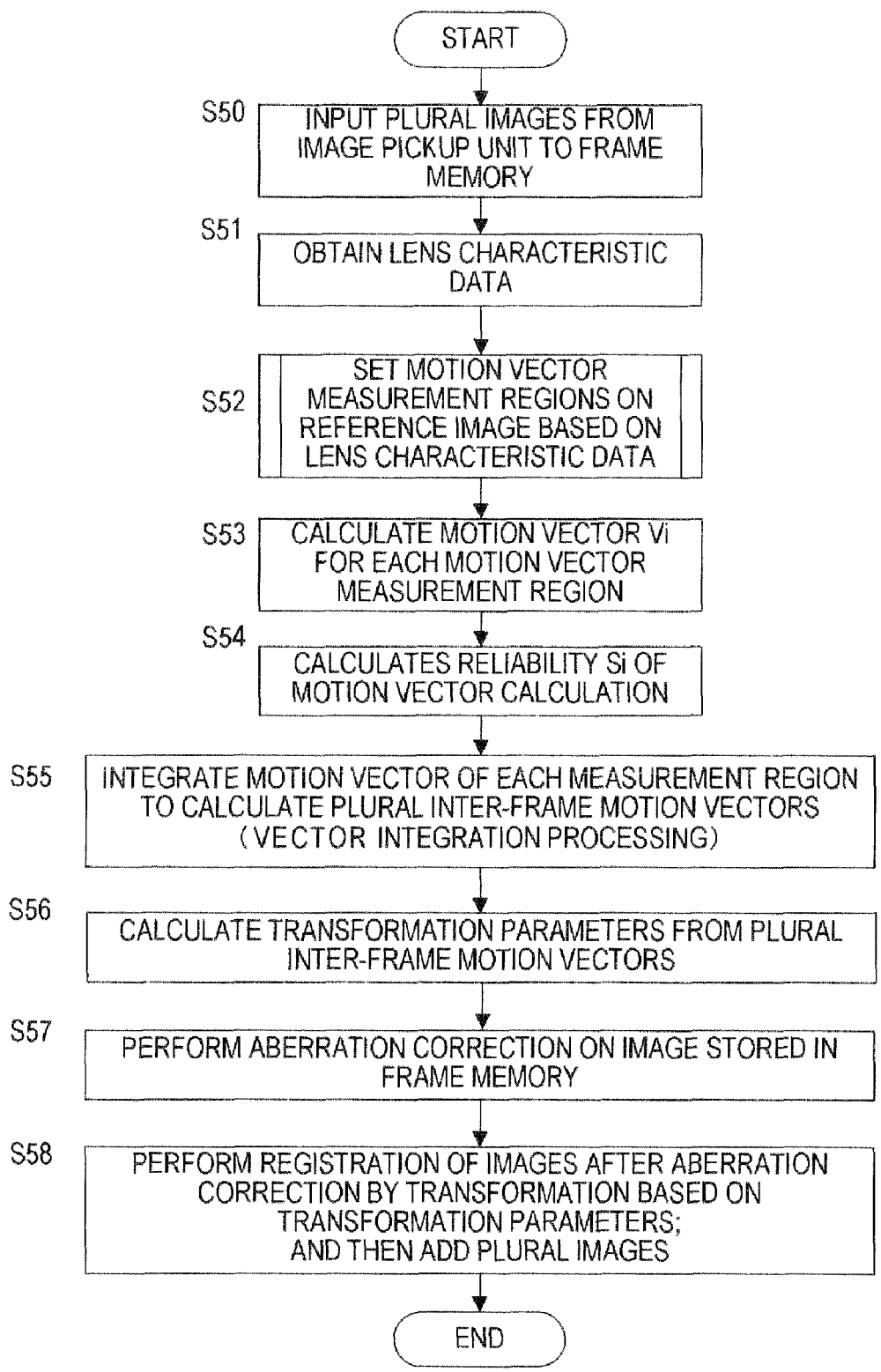
FIG. 13 is a flowchart showing an image processing procedure according to the fourth embodiment.

FIG. 13 is a flowchart showing a processing flow of the fourth embodiment. Here, the processing of steps S50-S54 is identical to the processing of the steps S10-S14 of the first embodiment, and therefore description has been omitted.

In a step S55, a plurality of inter-frame motion vectors (inter-frame motion vector representative values) are calculated on the basis of the motion vector of each measurement region. For example, on the frequency distribution of the third embodiment, shown in FIG. 11B, a plurality of bins are selected in descending order of the sum total (ΣSTi) of the reliability STi. Next, central vectors $V_{bin\_s}$ representing the selected bins are calculated as inter-frame motion vectors. For example, when four inter-frame motion vectors are calculated, the central vectors $V_{bin\_s}$ of bins having bin numbers 2, 3, 4, 5 in FIG. 11B are set as the four inter-frame motion vectors. Thus, appropriate transformation parameters can be calculated taking highly reliable inter-frame motion vectors into account preferentially and excluding inter-frame motion vectors having a low reliability.

In a step S56, transformation parameters relating to a projective transformation are calculated from the plurality of inter-frame motion vectors. In other words, transformation parameters of a transformation defined by the plurality of inter-frame motion vectors are calculated. Calculation of the transformation parameters will be described in detail below.

In a step S57, aberration correction is performed on the plurality of images. This processing is similar to the processing of the step S16 in FIG. 5. It should be noted that this processing is not limited to the sequence shown in the flowchart of FIG. 13, and the motion vector calculation and transformation parameter calculation of the steps S52-S56 may be performed in parallel with the aberration correction of the step S57.

In a step S58, transformation based on the transformation parameters determined in this manner is performed on the entire subject image to position the subject image relative to the reference image. The reference image and subject image are then added together.

Calculation of the transformation parameters will be described in detail below using transformation through an affine transformation as an example. Here, an example in which the transformation parameters are determined by a least square method on the basis of the plurality of inter-frame motion vectors, will be described. It should be noted that here, four inter-frame motion vectors are used, but the number of inter-frame motion vectors is not limited thereto.

First, in relation to centroid positions (central positions) of measurement regions corresponding to the four calculated inter-frame motion vectors ($V_1$, $V_2$, $V_3$, $V_4$), start points and end points of the centroid positions that are moved by the inter-frame motion vectors are set as follows. The measurement regions corresponding to the inter-frame motion vectors are measurement regions in which motion vectors quantized to the inter-frame motion vectors have been measured.

$$\text{Start points: } \begin{pmatrix} bx_1 \\ by_1 \end{pmatrix}, \begin{pmatrix} bx_2 \\ by_2 \end{pmatrix}, \begin{pmatrix} bx_3 \\ by_3 \end{pmatrix}, \begin{pmatrix} bx_4 \\ by_4 \end{pmatrix} \quad (12)$$

$$\text{End points: } \begin{pmatrix} bx'_1 \\ by'_1 \end{pmatrix}, \begin{pmatrix} bx'_2 \\ by'_2 \end{pmatrix}, \begin{pmatrix} bx'_3 \\ by'_3 \end{pmatrix}, \begin{pmatrix} bx'_4 \\ by'_4 \end{pmatrix} \quad (13)$$

In other words, the four inter-frame motion vectors ($V_1$, $V_2$, $V_3$, $V_4$) are expressed by a following Equation (14).

$$V_1 = \begin{pmatrix} bx'_1 \\ by'_1 \end{pmatrix} - \begin{pmatrix} bx_1 \\ by_1 \end{pmatrix},$$

$$V_2 = \begin{pmatrix} bx'_2 \\ by'_2 \end{pmatrix} - \begin{pmatrix} bx_2 \\ by_2 \end{pmatrix},$$

$$V_3 = \begin{pmatrix} bx'_3 \\ by'_3 \end{pmatrix} - \begin{pmatrix} bx_3 \\ by_3 \end{pmatrix},$$

$$V_4 = \begin{pmatrix} bx'_4 \\ by'_4 \end{pmatrix} - \begin{pmatrix} bx_4 \\ by_4 \end{pmatrix} \quad (14)$$

Meanwhile, a matrix notation of the affine transformation is expressed by a following Equation (15).

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad (15)$$

End points (Equation (16)) mapped by subjecting the above start points to affine transformation are determined from a following Equation (17).

$$\begin{pmatrix} bx''_1 \\ by''_1 \end{pmatrix}, \begin{pmatrix} bx''_2 \\ by''_2 \end{pmatrix}, \begin{pmatrix} bx''_3 \\ by''_3 \end{pmatrix}, \begin{pmatrix} bx''_4 \\ by''_4 \end{pmatrix} \quad (16)$$

$$\begin{pmatrix} bx''_1 & bx''_2 & bx''_3 & bx''_4 \\ by''_1 & by''_2 & by''_3 & by''_4 \\ 1 & 1 & 1 & 1 \end{pmatrix} = \begin{pmatrix} a & b & c \\ d & e & f \\ 0 & 0 & 1 \end{pmatrix} \begin{pmatrix} bx_1 & bx_2 & bx_3 & bx_4 \\ by_1 & by_2 & by_3 & by_4 \\ 1 & 1 & 1 & 1 \end{pmatrix} \quad (17)$$

Optimum values of transformation parameters a, b, c, d, e, f are then determined using a least square method, as shown in a following Equation (18).

$$a,b,c,d,e,f = \arg\min(a,b,c,d,e,f)\Sigma((bx''i - bx'i)^2 + (by''i - by'i)^2) \quad (18)$$

An example of an affine transformation was described above, but the transformation parameters of another projective transformation may be determined using a least square method on the basis of a plurality of inter-frame motion vectors in a similar manner.

Further, an example in which the transformation parameters are determined using a least square method was described above, but the transformation parameters may be determined easily by solving an equation using a minimum number of inter-frame motion vectors, as illustrated below.

For example, the transformation parameters may be determined in relation to a Euclidean transformation by solving a following Equation (19) on the basis of two inter-frame motion vectors (in other words, two sets of start points and end points).

$$\begin{pmatrix} bx'_1 & bx'_2 \\ by'_1 & by'_2 \\ 1 & 1 \end{pmatrix} = \begin{pmatrix} \cos\theta & -\sin\theta & c \\ \sin\theta & \cos\theta & f \\ 0 & 0 & 1 \end{pmatrix} \begin{pmatrix} bx_1 & bx_2 \\ by_1 & by_2 \\ 1 & 1 \end{pmatrix} \quad (19)$$

Here, θ is a rotation angle, c is the transformation parameter relating to horizontal shift, and f is the transformation parameter relating to vertical shift.

Further, the transformation parameters (a-f) may be determined in relation to an affine transformation by solving a following Equation (20) on the basis of three inter-frame motion vectors (in other words, three sets of start points and end points).

$$\begin{pmatrix} bx'_1 & bx'_2 & bx'_3 \\ by'_1 & by'_2 & by'_3 \\ 1 & 1 & 1 \end{pmatrix} = \begin{pmatrix} a & b & c \\ d & e & f \\ 0 & 0 & 1 \end{pmatrix} \begin{pmatrix} bx_1 & bx_2 & bx_3 \\ by_1 & by_2 & by_3 \\ 1 & 1 & 1 \end{pmatrix} \quad (20)$$

Hence, in the fourth embodiment, transformation parameters other than shift parameters can be calculated from a plurality of different inter-frame motion vectors. Therefore, even when transformation (rotation and so on) other than shift is included, accurate registration between a plurality of images can be achieved through transformation using these transformation parameters.

Furthermore, since projective transformation parameters are determined, the transformation parameters can be determined easily. When a least square method is used, the projective transformation parameters can be determined accurately. Moreover, when the projective transformation is an affine transformation or the like having six or less transformation parameters, the number of transformation parameters is smaller than the number of transformation parameters (eight) of a typical projective transformation, and therefore calculation processing for determining the transformation parameters is simplified.

The fourth embodiment may of course be applied to an aberration other than distortion.

[Modified Example of Fourth Embodiment]

In the fourth embodiment, an example of registration through image transformation using a projective transformation was described. However, registration may be performed through image transformation using so-called elastic matching. In so doing, parameters other than shift parameters can be taken into account, whereby the reference image and subject image can be positioned more appropriately than when transformation is performed through shift alone.

For example, on the frequency distribution of the third embodiment, shown in FIG. 11B, central vectors $V_{bin\_s}$ of a plurality of bins are calculated as inter-frame motion vectors in descending order of the sum total ($\Sigma STi$) of the reliability STi. Elastic matching is then performed such that displacement corresponding to the plurality of inter-frame motion vectors is realized, for example. As a result, the reference image and subject image can be positioned appropriately while increasing the effect of the motion vectors of measurement regions having a high reliability Si and taking into account local displacement through the elastic matching.

This modified example of the fourth embodiment may of course be applied to an aberration other than distortion.

[Other Embodiments]

In the embodiments described above, it is assumed that the processing performed by the image processing unit (image processing device) is hardware processing, but this invention need not be limited to such a constitution. For example, a constitution in which the processing is performed by separate software may be employed. In this case, the image processing unit includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image processing unit described above is realized.

Here, a computer-readable storage medium denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

This invention is not limited to the embodiments described above, and may be subjected to various modifications within the scope of the technical spirit of the invention.

The entire contents of Japanese patent application JP2008-202203, filed with the Japan Patent Office on Aug. 5, 2008, are incorporated into this specification by reference.

What is claimed is:

1. An image processing device that performs registration processing between a plurality of images using an image transformation defined by at least one inter-frame motion vector, comprising:
   a lens characteristic acquisition unit for obtaining a lens characteristic of an imaging lens that photographs the plurality of images;
   a motion vector measurement region setting unit for setting, on the basis of the lens characteristic, a plurality of motion vector measurement regions in each of which a motion vector is to be measured;
   a motion vector calculation unit for calculating the motion vectors of the plurality of motion vector measurement regions;
   a motion vector reliability calculation unit for calculating a reliability of each of the calculated motion vectors; and
   a motion vector integration processing unit for calculating the at least one inter-frame motion vector by integrating the motion vectors of the plurality of motion vector measurement regions in accordance with the reliability of the motion vectors.

2. The image processing device as defined in claim 1, wherein the motion vector measurement region setting unit sets the plurality of motion vector measurement regions to lie within a position range determined on the basis of the lens characteristic.

3. The image processing device as defined in claim 1, wherein the motion vector measurement region setting unit sets a centroid position of each of the plurality of motion vector measurement regions to lie within a position range determined on the basis of the lens characteristic.

4. The image processing device as defined in claim 2, wherein the motion vector measurement region setting unit selects the plurality of motion vector measurement regions from two or more predetermined regions.

5. The image processing device as defined in claim 3, wherein the motion vector measurement region setting unit selects the plurality of motion vector measurement regions from two or more predetermined regions.

6. The image processing device as defined in claim 2, wherein the lens characteristic acquisition unit obtains a lens characteristic relating to an aberration as the lens characteristic.

7. The image processing device as defined in claim 3, wherein the lens characteristic acquisition unit obtains a lens characteristic relating to an aberration as the lens characteristic.

8. The image processing device as defined in claim 6, wherein the motion vector measurement region setting unit determines, on the basis of the lens characteristic relating to the aberration, a range in which an evaluation value obtained using the aberration is no greater than a predetermined value as the position range.

9. The image processing device as defined in claim 7, wherein the motion vector measurement region setting unit determines, on the basis of the lens characteristic relating to the aberration, a range in which an evaluation value obtained using the aberration is no greater than a predetermined value as the position range.

10. The image processing device as defined in claim 2, wherein the motion vector measurement region setting unit determines, on the basis of the lens characteristic, a range in which a distance from an image center is no greater than a threshold as the position range.

11. The image processing device as defined in claim 3, wherein the motion vector measurement region setting unit determines, on the basis of the lens characteristic, a range in which a distance from an image center is no greater than a threshold as the position range.

12. The image processing device as defined in claim 10, wherein the motion vector measurement region setting unit sets the threshold to be steadily larger as a focal distance of the imaging lens increases.

13. The image processing device as defined in claim 11, wherein the motion vector measurement region setting unit sets the threshold to be steadily larger as a focal distance of the imaging lens increases.

14. The image processing device as defined in claim 1, wherein the motion vector measurement region setting unit sets the plurality of motion vector measurement regions on the basis of the lens characteristic and a distance from an image center.

15. The image processing device as defined in claim 1, wherein the image processing device performs the registration processing on the plurality of images using shift based on a single inter-frame motion vector as the image transformation, and
the motion vector integration processing unit calculates the single inter-frame motion vector by setting a weighting coefficient in accordance with the reliability and performing weighted addition on the motion vectors of the plurality of motion vector measurement regions in accordance with the weighting coefficient.

16. The image processing device as defined in claim 15, wherein the motion vector integration processing unit resets the reliability calculated by the motion vector reliability calculation unit to zero when the reliability is smaller than a prescribed value.

17. The image processing device as defined in claim 15, wherein the motion vector integration processing unit calculates the single inter-frame motion vector $V_{Frame}$ using a following equation $$V_{Frame} = \frac{1}{\Sigma STi} \Sigma STiVi$$

in which the motion vector relating to an $i^{th}$ motion vector measurement region is Vi and the reliability is STi.

18. The image processing device as defined in claim 1, wherein the image processing device performs the registration processing on the plurality of images using shift based on a single inter-frame motion vector as the image transformation, and
the motion vector integration processing unit separates the motion vectors of the plurality of motion vector measurement regions into classes and calculates a vector representing a class in which a sum total of the reliability of the motion vectors belonging to the class has reached a maximum as the single inter-frame motion vector.

19. The image processing device as defined in claim 1, wherein the image processing device performs the registration processing on the plurality of images using the image transformation including a transformation other than shift,
the motion vector integration processing unit calculates a plurality of inter-frame motion vectors for determining transformation parameters defining the image transformation, and
the image processing device comprises a transformation parameter calculation unit for calculating the transformation parameters from the plurality of inter-frame motion vectors.

20. The image processing device as defined in claim 19, wherein the motion vector integration processing unit separates the motion vectors of the plurality of motion vector measurement regions into classes, selects a plurality of classes in descending order of a sum total of the reliability of the motion vectors belonging to an identical class, and sets vectors respectively representing the selected plurality of classes as the plurality of inter-frame motion vectors.

21. The image processing device as defined in claim 19, wherein the transformation parameter calculation unit determines parameters of a projective transformation as the transformation parameters.

22. The image processing device as defined in claim 1, wherein the imaging lens includes a storage unit storing lens parameters of the imaging lens as the lens characteristic in association with arrangement information of the imaging lens, and
the lens characteristic acquisition unit obtains the lens characteristic stored in the storage unit in accordance with the arrangement information of the imaging lens.

23. The image processing device as defined in claim 6, wherein the image processing device includes an aberration correction unit for correcting the aberration in the plurality of images, and
the motion vector integration processing unit calculates the at least one inter-frame motion vector in relation to the plurality of images before the aberration is corrected.

24. The image processing device as defined in claim 7, wherein the image processing device includes an aberration correction unit for correcting the aberration in the plurality of images, and
the motion vector integration processing unit calculates the at least one inter-frame motion vector in relation to the plurality of images before the aberration is corrected.

25. The image processing device as defined in claim 1, comprising an addition unit for performing the registration and adding together the plurality of images.

26. The image processing device as defined in claim 1, comprising a blur correction unit for correcting inter-frame blur by the registration of the plurality of images using an image transformation defined by the at least one inter-frame motion vector.

27. An image pickup apparatus having an imaging lens and an image pickup unit for converting an optical image formed by the imaging lens into an electric signal, which performs registration processing between a plurality of images obtained from the image pickup unit using an image transformation defined by at least one inter-frame motion vector, comprising:
a lens characteristic acquisition unit for obtaining a lens characteristic of the imaging lens that photographs the plurality of images;
a motion vector measurement region setting unit for setting, on the basis of the lens characteristic, a plurality of motion vector measurement regions in each of which a motion vector is to be measured;
a motion vector calculation unit for calculating the motion vectors of the plurality of motion vector measurement regions;
a motion vector reliability calculation unit for calculating a reliability of each of the calculated motion vectors; and
a motion vector integration processing unit for calculating the at least one inter-frame motion vector by integrating the motion vectors of the plurality of motion vector measurement regions in accordance with the reliability of the motion vectors.

28. A storage medium storing an image processing program for causing a computer to execute:
- a lens characteristic acquisition procedure for obtaining a lens characteristic of an imaging lens that photographs a plurality of images;
- a motion vector measurement region setting procedure for setting, on the basis of the lens characteristic, a plurality of motion vector measurement regions in each of which a motion vector between the plurality of images is to be measured;
- a motion vector calculation procedure for calculating the motion vectors of the plurality of motion vector measurement regions;
- a motion vector reliability calculation procedure for calculating a reliability of each of the calculated motion vectors;
- a motion vector integration processing procedure for calculating at least one inter-frame motion vector by integrating the motion vectors of the plurality of motion vector measurement regions in accordance with the reliability of the motion vectors; and
- a procedure for performing registration of the plurality of images using an image transformation defined by the at least one inter-frame motion vector.

* * * * *